United States Patent
Song

(10) Patent No.: US 6,917,357 B2
(45) Date of Patent: Jul. 12, 2005

(54) HANDY MOUSE WITH A DIRECTION-SWITCH DEVICE

(75) Inventor: Bo-Jun Song, ChangChi (CN)

(73) Assignee: Aiptek International Inc., Hsinchu (TW)

( * ) Notice: Subject to any disclaimer, the term of this patent is extended or adjusted under 35 U.S.C. 154(b) by 360 days.

(21) Appl. No.: 10/216,784

(22) Filed: Aug. 13, 2002

(65) Prior Publication Data

US 2004/0032396 A1 Feb. 19, 2004

(51) Int. Cl.$^7$ .................................................. G09G 5/08
(52) U.S. Cl. ........................ 345/163; 345/167; 345/157
(58) Field of Search ................................. 345/167, 163, 345/165, 184, 157

(56) References Cited

U.S. PATENT DOCUMENTS

| | | | | |
|---|---|---|---|---|
| 5,726,684 A | * | 3/1998 | Blankenship et al. | ....... 345/167 |
| 5,963,197 A | * | 10/1999 | Bacon et al. | ................ 345/163 |
| 6,198,473 B1 | * | 3/2001 | Armstrong | ................... 345/163 |
| 6,285,355 B1 | * | 9/2001 | Chang | ......................... 345/163 |
| 6,522,321 B1 | * | 2/2003 | Chen et al. | .................. 345/163 |
| 6,563,490 B1 | * | 5/2003 | Wang et al. | ................ 345/165 |

* cited by examiner

*Primary Examiner*—Albert Decady
*Assistant Examiner*—Fritz Alphonse
(74) *Attorney, Agent, or Firm*—Troxell Law Office, PLLC

(57) ABSTRACT

A handy mouse with a direction-switch device that is operable in both a palm and on a flat surface, for instance, a table surface. The direction-switch device switches directions via gravity. The handy mouse includes a roller stand supporting a roller for positioning; and a case, a PCB, a roller, a roller stand, a direction-switch gear, a mouse IC, a plurality of circuits and a sensor.

5 Claims, 2 Drawing Sheets

HANDY MOUSE WITH A DIRECTION-SWITCH DEVICE

FIELD OF THE INVENTION

The invention relates to a handy mouse with direction-switch device, especially a mouse whose functions are not only with the priors', but also the function that it can be operated upside down.

BACKGROUND OF THE INVENTION

The present computer input and courser positioning is by way of a mouse, which is very convenient but tired; and enough space, surface are needed but not operated in hand. Following the wide band technology, the multi-media technology and the wider screen day by day, a mouse which is smaller, more convenient and used as a TV remote controller is discussed hereinafter.

SUMMARY OF THE INVENTION

The main objective of the invention is to provide a smaller, handy mouse with remote control function and no surface need; further the mouse with a direction-switch device can be operated as a general mouse.

For your esteemed reviewing committee members to understand and recognize the invention, a detailed description matched with corresponding drawings is presented as follows.

DETAILED DESCRIPTION OF THE INVENTION

The present invention is a handy mouse with a direction-switch device applied to information field, the information field covers private PCs, business computers, etc. Inside the mouse has a direction-switch gear to automatically switch direction via gravity; further, the direction-switch function is to switch circuits in the direction-switch gear, and a roller stand, which is suitable to any operation direction.

The merits and effects of the present invention are the following: firstly, only a single finger is able to control a roller, and further to a courser; secondly, there is no more space needed; thirdly, the mouse is convenient to operate; fourthly, it can be used as a general mouse; fifthly, it is a low cost device with precise positioning function and wide application.

Figure 1:
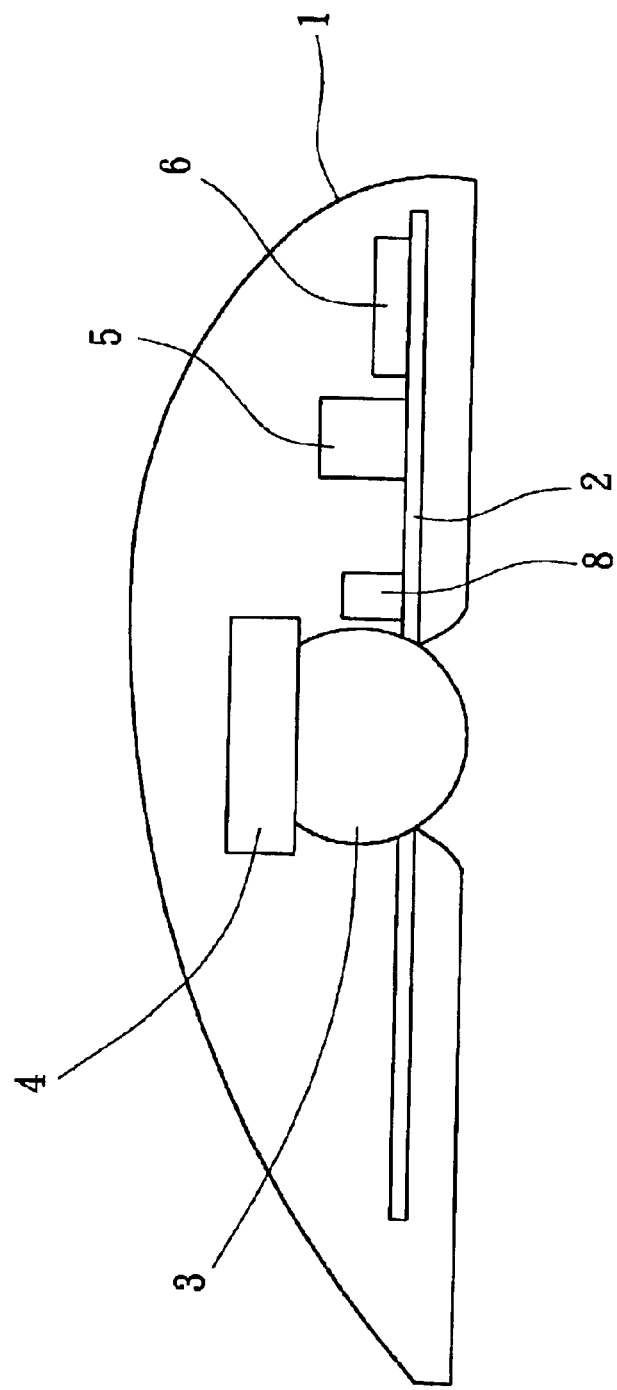
FIG. 1 is a scheme of a structure of a mouse with a direction-switch device of the present invention.

Please refer to FIG. 1, which is a scheme of a structure of a mouse with a direction-switch device of the present invention. The present invention includes: a case 1, a PCB 2, a roller 3, a roller stand 4, a direction-switch gear 5, a mouse IC 6, circuits 7 and a sensor 8 (not shown in figure). The roller stand 4 is around the roller 3, and roller 3 can nimbly move under the condition of roller stand 4 supporting and not stray from its original position. When the mouse is used as a general mouse, which means it is placed on a table, roller stand 4 is not applying to roller 3. The direction-switch gear 5 connects to two input/output circuits 7, which are switched each other when the direction-switch function is on. As a general life, direction-switch gear 5 is a mercury switch. The mouse IC 6 is a device to control information and operation. The sensor 8 collects moving information of roller 3 and transmits the information, thus mouse IC 6 continuously processes such information. The PCB 2 is as a plate to be as a bottom of the aforesaid elements, and it is a middle role to connect elements as well. The case 1 contains the element number from 2 to 8 for protection and palm holding.

Figure 2:
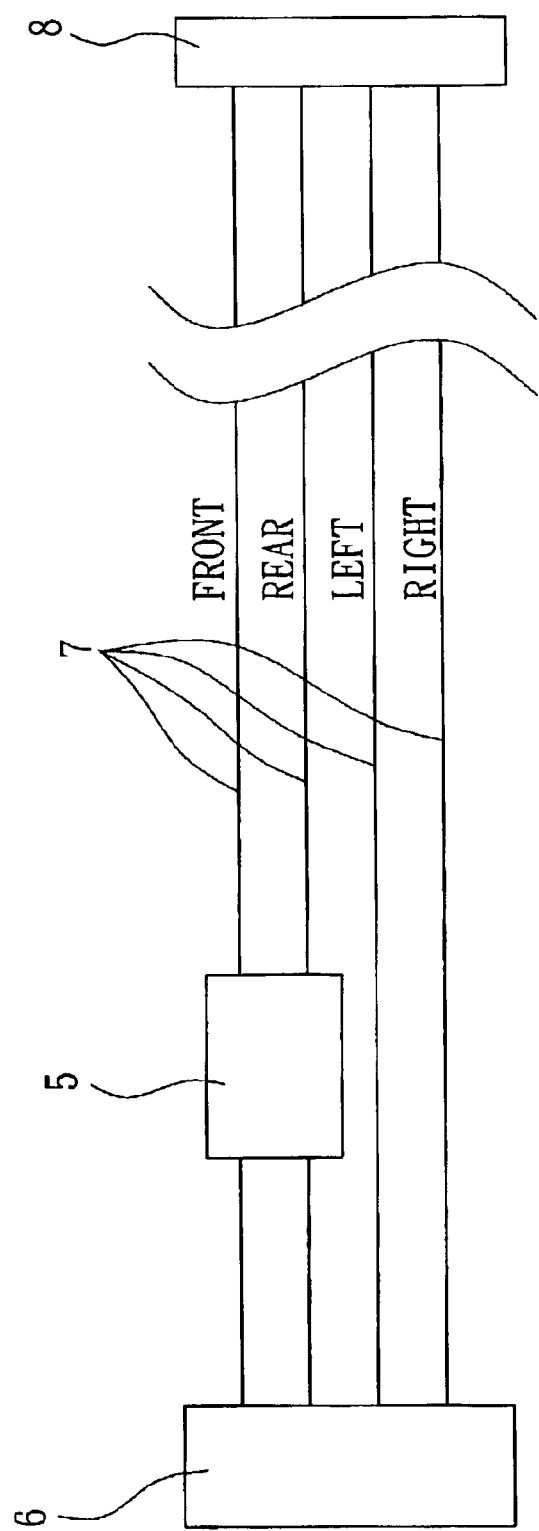
FIG. 2 is a scheme of circuits of a direction-switch gear of the present invention.

Please refer to FIG. 2, which is a scheme of circuits of a direction-switch gear of the present invention. Two circuits marked front and rear are switched each other; wherein the two circuits connect to direction-switch gear 5 and mouse IC 6, and then to sensor 8 together with other circuits; further those other circuits connect to mouse IC 6 as well. While the present invention using as a general mouse, roller 3 freely moves because of friction and motivates related elements. At the moment, direction-switch gear 5 does not apply yet, thus sensor 8 transmitting signals of front, rear, left and right of circuits 7 to mouse IC 6 do not work properly. On the other hand, while the present invention is held in a palm, which means it is placed upside down, roller 3 is toward up and against to roller stand 4 because of gravity. In the meantime, since the reason of roller stand 4, roller 3 cannot stray from its original position, but still freely moving, therefore, only a single finger is able to operate. Under the condition, the two circuits marked front and rear are switched each other in direction-switch gear 5, therefore signals transmitted by the two circuits are exchanged as well. Right and left direction for user are not changed, so there is no need to switch the right and left circuits. Again, direction-switch gear 5 switches front and rear circuits by way of gravity, because while the present invention is placed upside down, gravity drags the two circuits in direction-switch gear 5 to change their original positions for suiting a normal mouse position.

Moreover, the preferable embodiment described in above section is to illustrate the invention in a detailed way and is not limitation to the scope of the invention. Those who are skilled in such arts should understand that their appropriate and slight variation and modification still keep the merits of the invention and are also within the spirit and scope of the invention.

In summary, the solidification of execution of the invention is really fulfilled the patent essence of invention regulated in the patent law, so please your esteemed reviewing committee review this patent application in a favorable manner and permit it as a formal patent wishfully.

What is claimed is:

1. A mouse with a direction-switch device for use with an electronic device comprising:
   a) a case;
   b) a roller rotatably positioned in a bottom of the case and movable between first and second positions;
   c) a roller stand located in the case and selectively engaging the roller;
   d) a PCB located in the case;
   e) a direction switch gear located on the PCB;
   f) a mouse IC located on the PCB;
   g) a sensor located on the PCB and monitoring movement of the roller; and
   h) a plurality of circuits located on the PCB, at least first and second circuits of the plurality of circuits are connected to the mouse IC and the sensor, at least third and fourth circuits of the plurality of circuits are selectively connected to the mouse IC and the sensor with the direction switch gear located there between, wherein, when the roller is positioned below the roller stand, the roller is in a first position disengaged from the roller stand and the direction switch gear opens the at least third and fourth circuits of the plurality of circuits electrically disconnecting the sensor from the mouse IC, and, when the roller is positioned above the roller stand, the roller is in a second position engaged with the roller stand and the direction switch gear closes the at least third and fourth circuits of the plurality of circuits electrically connecting the sensor to the mouse IC.

2. The mouse according to claim 1, wherein the direction switch gear controls the at least third and fourth circuits of the plurality of circuits.

3. The mouse according to claim 1, wherein the direction switch gear is a mercury switch.

4. The mouse according to claim 1, wherein the sensor collects moving information of the roller and transmits a signal through the plurality of circuits.

5. The mouse according to claim 1, wherein the electronic device is a computer.

* * * * *